May 14, 1957   O. H. LINDSTROM   2,791,800
HOG STOMACH OPENER AND WASHER
Filed Nov. 26, 1954   2 Sheets-Sheet 1
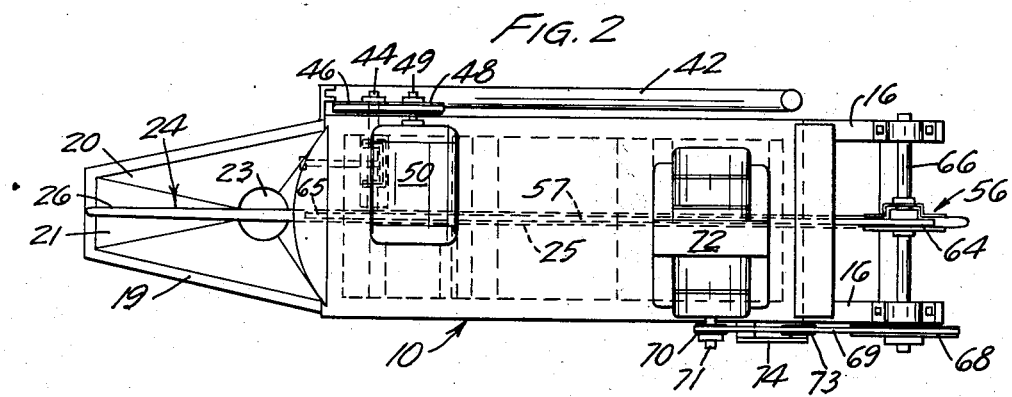
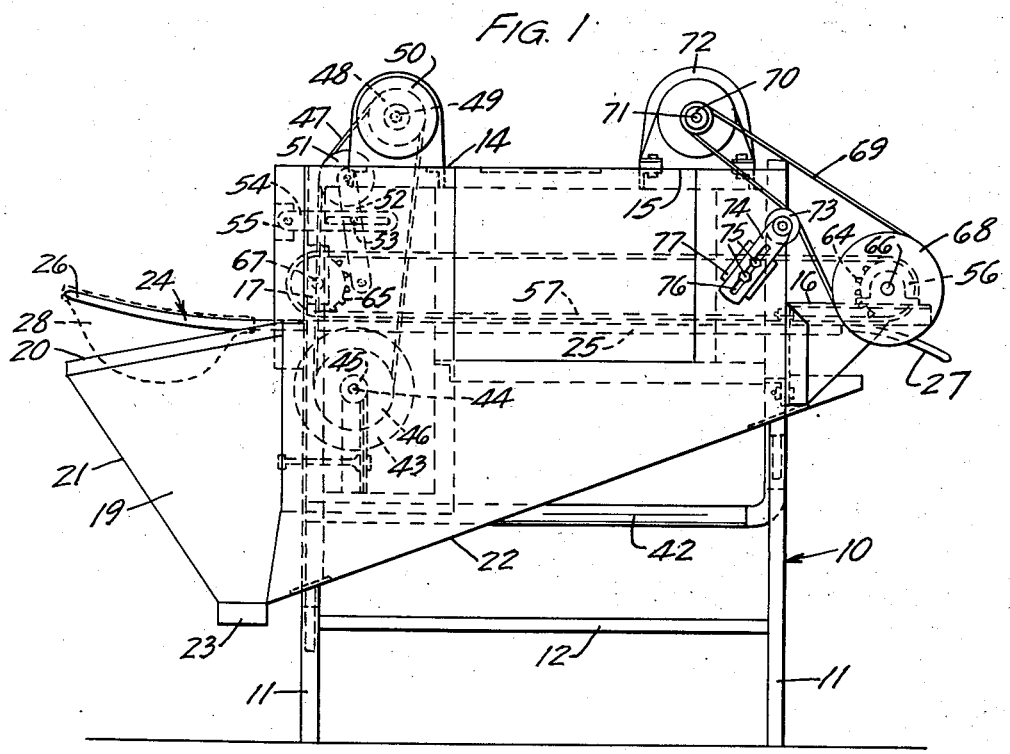
INVENTOR
BY OSCAR H. LINDSTROM
Williamson, Williamson, Schroeder, & Adams
ATTORNEYS May 14, 1957 — O. H. LINDSTROM — 2,791,800
HOG STOMACH OPENER AND WASHER
Filed Nov. 26, 1954 — 2 Sheets-Sheet 2
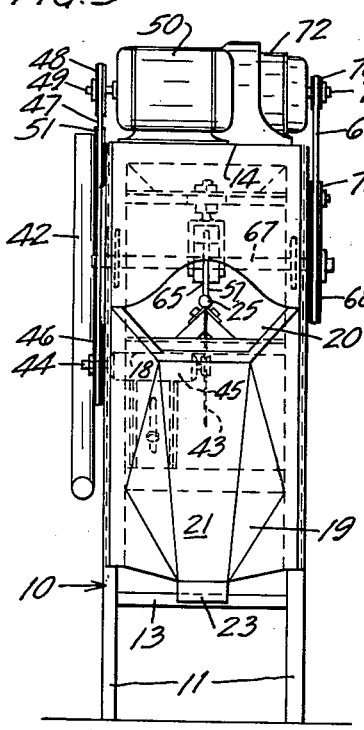
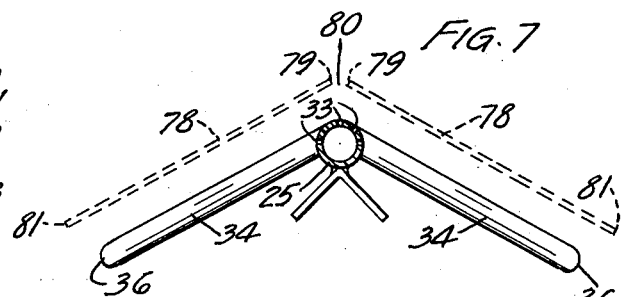
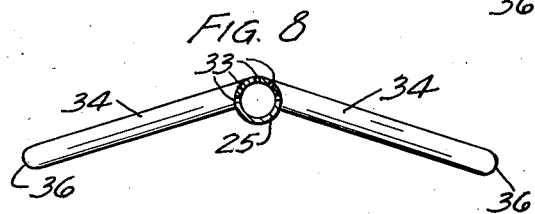
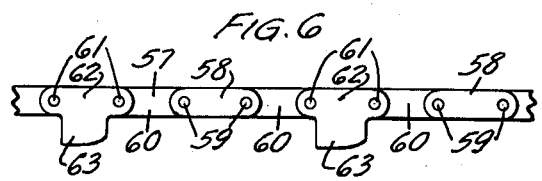
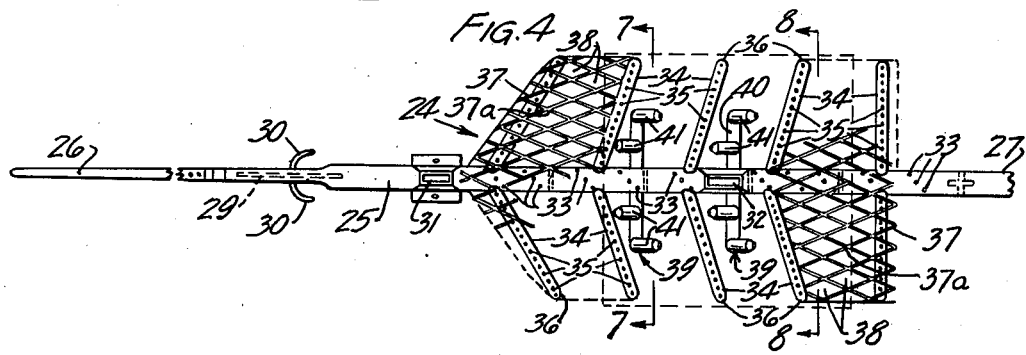
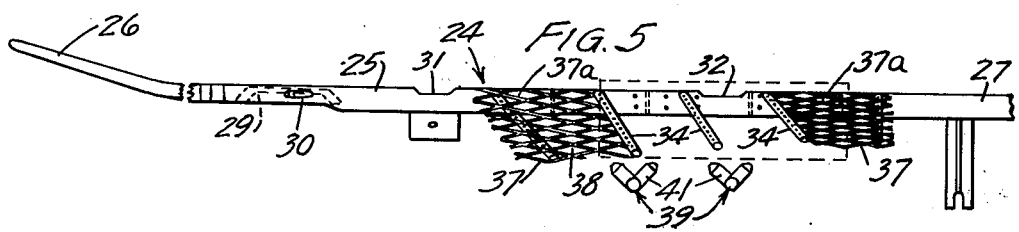
INVENTOR
OSCAR H. LINDSTROM
BY Williamson, Williams, Schroeder & Adams
ATTORNEYS United States Patent Office 2,791,800
Patented May 14, 1957

2,791,800

HOG STOMACH OPENER AND WASHER

Oscar H. Lindstrom, Austin, Minn., assignor to Geo. A. Hormel & Company, Austin, Minn., a corporation of Delaware Application November 26, 1954, Serial No. 471,365

3 Claims. (Cl. 17—43)

This invention relates to the slaughtering of animals in the meat packing industry, and more particularly to an apparatus for opening and washing the separated stomachs of hogs.

It is an important object of the invention to provide an efficient apparatus which will rapidly and thoroughly open and clean a hog stomach which has been freshly severed from the remainder of a hog carcass.

It is another object of the invention to provide a system for automatically, and in continuous sequence, slitting and disgorging the contents of a hog stomach followed by complete washing of each of the stomachs.

It is a further object of the invention to provide an apparatus in which a hog stomach may be mounted for continuous movement over guiding and supporting means, the stomach being automatically acted upon by elements intercepting the projected pathway thereof to sequentially slit open the stomach, clean out the bulk of the contents, and flush, scrape and spray the inner walls thereof in thorough manner to complete the washing operation.

It is a further object of the invention to provide apparatus of the class described which has novel scraping and cooperative washing members which will perform their appointed tasks without further handling of a hog stomach than merely pulling it from the entrance to the exit of the apparatus.

These and other objects and advantages of the invention will more fully appear from the following description made in connection with the accompanying drawings, wherein like reference characters refer to the same or similar parts throughout the several views, and in which:

Fig. 1 is a side elevation of my hog stomach opening and washing apparatus, certain hidden portions thereof being shown in dotted line;

Fig. 2 is a top plan view of the apparatus with the outline of hidden portions thereof being shown in dotted lines;

Fig. 3 is an end elevation taken from the left in Figs. 1 and 2, elements not directly visible being indicated in dotted lines;

Fig. 4 is an enlarged top view of the cleaning structure showing the mounting and interrelation of the parts thereof, portions being cut away for clarity;

Fig. 5 is a side view of the cleaning structure shown in Fig. 4;

Fig. 6 is an enlarged segment of the roller chain advancing member;

Fig. 7 is an enlarged vertical section of the guiding and supporting element taken on the line 7—7 of Fig. 4 and omitting the lower spraying means and other adjacent structure; and Fig. 8 is an enlarged vertical section of the guiding and supporting element taken on the line 8—8 of Fig. 4 and looking in the direction of the arrows, the abrading means being omitted from the view.

With continued reference to the drawings, Fig. 1 is a side elevation of my hog stomach opening and washing apparatus in which a supporting frame is indicated generally at 10. This frame may consist simply in upright legs 11 between which suitable braces 12 may be rigidly interposed in lengthwise relation and braces 13 interposed in transverse relation to the general longitudinal disposition of the apparatus. The framework 10 may be further provided with motor and bearing mounts as at 14, 15, 16, 17 and 18, details of which will be described later in the specification. The frame structure is also adapted to hold a hopper 19 which has a flared open top 20 with a steep front wall 21 and a sloping rear wall 22 converging downwardly in a discharge spout 23. The open flared mouth 20 extends to the side legs of frame 10 and extends rearwardly to underlie the entire mechanism of the apparatus so that all material discharged into hopper 19 will be flushed downwardly through the discharge spout 23. The hopper 19 may be secured to the legs 11 of the frame 10 and further braced as necessary to the framework so as to maintain it in rigid relation therewith for receiving waste material from the washing operation.

A cleansing structure, shown generally at 24 in Figs. 4 and 5, is mounted on the frame 10 and adapted to medially extend over the entire length of hopper 19, as shown in Fig. 2. The cleaning structure has an elongated ridge pole or tube 25 which extends for the entire length thereof in continuous manner and comprises several portions each functioning cooperatively with the ridge tube to assist in thoroughly cleaning the hog stomach. The ridge tube 25 also constitutes a guiding and supporting element for the continuous positioning of a hog stomach in traveling from the head or forward end, which has an outwardly extending free end 26, to the rear end 27 from which the opened and cleansed hog stomach is discharged. The forward free end 26 is closed with respect to the body portion 25 which is tubular, and preferably has a slight upward angulation as shown in Figs. 1 and 5. The outwardly extending free end 26 is adapted to receive a separated whole hog stomach 28 in freshly butchered condition through the pyloric valve and pocket thereof as shown in Fig. 1. The elongated guiding and supporting element 25 has a recessed slot 29 formed in the underside of the forwardly extending free end 26 to permit a cutting element to operate in clearance therewith as will be subsequently described.

Attached to the elongated guiding and supporting element at each side in the area of the recess 29, is a pair of oppositely disposed arms 30 which are preferably curved as shown in Fig. 4 and rigidly formed so as to assist in opening the stomach and disgorging the main portion of the stomach contents preliminary to the final cleansing operation. The medial area of the guiding and supporting element 25 constitutes the ridge tube which is hollow in structure so as to be capable of delivering water under pressure thereto. A flushing port 31 is disposed through the upper wall of the elongated ridge tube adjacent and rearwardly of the arms 30, as shown in Figs. 4 and 5. Another such flushing port 32 is disposed rearwardly of the first port 31, and both of these ports are adapted to be supplied with pressurized water to exert an upward gushing stream of water for the purpose of thoroughly flushing and washing the hog stomach as well as continually bathing the parts of the cleaning structure which may have material clinging thereto. Additional orifices or ports 33 are formed at strategic locations through the upper side of the elongated guiding and supporting element in the tube area so as to lubricate and assist in the cleaning operation.

Just rearwardly of the first port 31 and extending rearwardly in rib fashion, is a plurality of tubular pipes 34 which are preferably symmetrically opposed and extending outwardly and downwardly in fluid communication with the tubular portion of the elongated guiding and supporting element 25. The pipes 34 are preferably swept back at the forward portion of the cleaning structure 24 and progressively raised to form a lesser angle with the horizontal and likewise being swept back to a lesser degree toward the rearward or discharge end of the cleaning structure 24 as shown in Figs. 4 and 5. The pitch of the forward pipes 34 is shown in detail in Fig. 7 and that of the rearward pipes 34 is shown in detail in Fig. 8. Each of the pipes 34 is provided with a plurality of orifices 35 which are upwardly directed and receive pressurized water from the main tubular portion 25 of the guiding and supporting element. It is understood, of course, that the ends 36 of each of the pipes 34 are closed so that full pressure will be exerted upon the orifices to present a fixed and constant spray of water upwardly directed upon the lining of the hog stomach as will be subsequently described in detail.

Spreading and scraping wings 37 are provided so as to present a roughened upwardly directed perforate surface 37a for abrading the lining of the hog stomach, and it has been found that expanded metal will produce the desired abrading effect while permitting a large area of spaced perforations or openings 38 between the interstices of the metal to exist. The spreading and scraping wings are preferably mounted over several of the pipes 34 constituting the rib structure before mentioned, and as shown in Figs. 4 and 5, the expanded metal wings 37 are positioned in supported relation with the first two pair of pipes 34, and a somewhat similar expanded metal wing member 37 is similarly supported in close contact over the last pair of pipes 34. It will be observed that the openings 38 are sufficient to permit streams of water to be projected through the orifices 35 so as to pass through the roughened upper surface 37a of the wing members 37 and to impinge upon the hog stomach lining as it progresses along the guiding and supporting element 25. The openings 38 will likewise permit material cleaned from the stomach to drop therethrough and into the hopper 19 in the progressive travel of the stomach through the apparatus. The entire cleaning structure 24 may be mounted across frame structure cross braces 13 and may be secured at other strategic positions upon the framework 10, it being borne in mind that the forwardly extending end 26 of the guiding and supporting element as well as the upper surface thereof must be kept free and open for the travel of the hog stomach along the full length thereof.

Spray means, in addition to that supplied by the ports 31, the orifices 33 and the pipe orifices 35, are preferably positioned intermediate the forward and rearward wing members 37. Such spray means are shown at 39 and constitute a cross tube 40, one each between an expanded metal wing 37 and the intermediate set of pipes 34, as shown in Fig. 4. The additional spray means 39 may constitute a plurality of jets or nozzles 41 in fluid communication with the cross pipe 40 and arranged generally as shown in Fig. 4. It is intended that the pressurized water which is projected from the nozzles or jets 41 will be of a strong impinging nature and will serve to dislodge and loosen any particles not otherwise affected prior to the stomach passing over this medial area.

The elongated ridge tube of the guiding and supporting element 25 may be connected with any suitable source of fluid pressure to the connecting pipe 42 as shown in Fig. 1, the latter also serving to supply the additional spray means 39 as shown in Fig. 4.

A cutting member such as the rotary saw blade 43 is mounted on a shaft 44 which in turn is journaled through the bearing 45 mounted upon a bearing brace 18 as shown in Fig. 3. The outer cutting edge of the circular saw 43 is adapted to interfit in close clearance with the edges of the notched portion 29 so that the circumference of the saw will be interrupted by a plane underlying the forwardly extending free end 26 of the guiding and supporting element 25. The saw blade 43 is rotated by means of pulley 46 secured to shaft 44 and in driving contact through belt 47 with sheave 48 secured in turn to the shaft 49 of motor 50. Motor 50, as previously noted, is mounted at the top of the apparatus to the mounting structure 14. A belt tightening idler wheel 51 is journaled on a pivotal arm 52 which in turn is adjustably secured at 53 to a slotted bracket 54 secured at 55 to a portion of the framework 10, as shown in Fig. 1. The saw blade 43 is caused to rotate preferably in a counter-clockwise direction as viewed in Fig. 1, to prevent binding and grabbing of the saw blade during the forward travel of each stomach through the apparatus.

An advancing member shown generally at 56 closely overlies the guiding and supporting element 25 and has a flexible endless belt member 57 preferably in the form of a link belt as shown in detail in Fig. 6. Links 58 are constructed in normal manner so as to be pivotally secured through cross pivots 59 to the connecting links 60. Connecting links 60 in turn are pivotally secured at 61 at each end to a special link 62 each of which has a depending finger 63 adapted to engage and grip the upper side of hog stomach 28 in its travel along the guiding and supporting element 25. The advancing member 56 preferably constitutes a pair of sprockets 64 and 65 which are respectively secured to shafts 66 and 67 as shown in Fig. 1. The link belt 57 operates around the sprockets 64 and 65 so that the depending fingers 63 will engage a hog stomach and pull it in continuous manner from one end of the apparatus to the other. The sprocket 64 forms the drive for the advancing member and it is interconnected through shaft 66 with a drive sheave 68 which in turn is driven through belt 69 by the motor sheave 70 secured to shaft 71 of motor 72. The motor 72 is mounted upon motor mount 15 forming a part of the frame structure 10. A belt tightening idler wheel 73 journaled to an adjustable arm 74 bears against the belt 69 and may be adjustably fixed by bolts 75 lying in sliding relation with slots 76 in the adjustable arm 74. The bolts 75 are threadably secured in the plate 77 which in turn is fixed to a portion of the framework 10, as shown in Fig. 1. The flexible belt 57 with its depending fingers 63 operates in alignment along the greater portion of the length of the guiding and supporting element and travels between a pair of shielding plates 78 each of which closely overlies the cleansing structure 24 at respective sides of the guiding and supporting element 25, as shown in Fig. 7. The upper ends of the shielding plates 78 terminate at 79 so as to create a slotted opening 80 permitting the operation of the flexible member 57 therebetween. The lower ends 81 of the shields 78 terminate sufficiently outward to shield any water spray which is not intercepted by a portion of a hog stomach in its progress along the guiding and supporting element.

In the use and operation of the foregoing apparatus for opening and washing hog stomachs, the freshly severed hog stomach is brought to the forwardly extending free end of the elongated guiding and supporting element and is mounted upon the free end by placing the pyloric valve over the end and moving the stomach inwardly toward the apparatus so that the free end will engage and extend through the pocket at the other end of the severed stomach. The stomach is then moved a short distance further until the chain member 57 with its depending fingers 63, engages the upper side of the stomach 28 in the area of the pyloric valve. The stomach will then be automatically moved along the elongated guiding and supporting element 25 for the remainder of the opening and washing operation.

As the stomach begins to proceed along the guiding and supporting element under the automatic advancing influence of chain 57, it engages the circumferential cutting edge of the rotary saw 43 and the pyloric valve is first severed at the underside, following which the saw cuts completely through the wall of the stomach from the pyloric valve downwardly and then upwardly at the pocket portion of the stomach. As the cutting operation proceeds, the pyloric valve portion will first engage the arms 30 and cause the stomach to begin to spread. As the fingers 63 further progress, the curved portion of arms 30 will dislodge the bulk of the contents which will fall into hopper 19 preliminary to the cleansing operation. The opened stomach is then further advanced until it is aligned with the flushing port 31 which will deliver a large quantity of water against the lining of stomach 28 to generally dislodge the larger particles which were not previously dislodged by the arms 30. The stomach then progresses under the influence of the flexible chain 57 and is pulled over the first pair of spreading and scraping wings 37 and, because of the downward and outward sweep of the pipes 34, will tend to progress thereover in outwardly extended relation somewhat in the nature of the roof flaps of a tent, the tube 25 being similar to a ridge pole for supporting the outwardly extending sheet areas of the slit stomach. The upwardly directed spray of water through pipes 34 will assist in bringing the stomach outwardly and in contact with the roughened surface of the wings 37 so as to abrade and rub the lining to remove additional particles and mucus from the stomach lining. As the stomach progresses across the wings 37, it will again pass over a pair of pipes 34 which provide continuous upwardly directed spray as previously described. At this point the stomach comes under the influence of powerful jet sprays emanating from the nozzles 41 which may be positioned strategically to give the best impinging action to the stomach lining to effect additional washing and dislodging of particles. The impinging water spray from nozzles 41 will tend to maintain the stomach lining in outward relation with respect to the medial guiding and supporting tube 25 and will maintain such outward relation even in the presence of a lifting force imparted by the impinging spray since shields 78 closely overlie the cleansing structure and will prevent an undesirable excessive lifting effect. The stomach then passes over another pair of pipes 34 which lie intermediate two sets of impinging spray nozzles, and the stomach is again subjected to impinging spray from the second set. Finally, the stomach is drawn over a second pair of spreading and scraping wings which also have in association therewith a plurality of supporting pipe members with upwardly directed spray orifices 35. The final set of spray pipes and its associated spreading and scraping wings are now more greatly extended so as to open the stomach to its fullest degree. At this period of the operation, there are virtually no particles left clinging to the stomach lining and the final spray is merely to remove traces of mucus and to be sure that the cleaning operation is concluded. The stomach progresses over the discharge end of the elongated guiding and supporting element and may be transported from this end for further processing by means not shown.

The apparatus employed greatly speeds up the cleaning of hog stomachs, and the novel arrangement of guiding and supporting means in conjunction with the advancing means and impinging water spray as well as the physical abrasion of the stomach lining, makes possible the opening and thorough washing of 750 stomachs per hour. It is within the contemplation of the invention to make certain adjustments such as applying a greater or lesser pressure of water and especially adjusting the strength of the impinging sprays so as to compensate for variations encountered due to seasons of the year, type of stomach contents, and the size of the stomachs. It may thus be seen that I have devised a novel apparatus which is extremely efficient in automatically handling a hog stomach together with its contents so as to slit open, dislodge, flush, abrade and wash the entire stomach in a short space and in a short period of time, and furthermore without any special handling but merely by advancing the stomach in its originally mounted condition in a continuous and straight pathway through the machine while subjecting it to the various operations herein noted.

It will, of course, be understood that various changes may be made in the form, details, arrangement and proportions of the various parts without departing from the scope of my invention.

What is claimed is:

1. Apparatus for opening and washing hog stomachs and the like comprising, an elongated guiding and supporting tube having a closed free end extending forwardly of the apparatus for receiving a separated whole hog stomach through the pyloric valve and pocket thereof, said tube being adapted to receive a supply of water under pressure, an advancing member closely overlying the guiding and supporting tube and adapted to engage and pull a stomach in guided relation along the guiding and supporting tube, a cutting member closely underlying the guiding and supporting tube and disposed in opposed relation to said advancing member adjacent the forwardly extending free end of the guiding and supporting tube for slitting said stomach completely open, a plurality of laterally secured pipes connected in fluid communication with the guiding and supporting tube and having upwardly directed orifices for spraying water upwardly against the lining of a stomach, and expanded metal sheets supported by the laterally secured pipes and providing perforate scraping surfaces for abrading the lining of the stomach in its opened condition while simultaneously flushing and washing the same stomach lining.

2. Apparatus for opening and washing hog stomachs and the like comprising, an elongated guiding and supporting element having an outwardly extending free end for receiving a separated whole hog stomach through the pyloric valve and pocket thereof, an advancing member closely overlying the guiding and supporting element and adapted to engage and pull a stomach in guided relation along the guiding and supporting element, a cutting member closely underlying the guiding and supporting element and disposed in opposed relation to said advancing member adjacent the outwardly extending free end of the guiding and supporting element for slitting said stomach completely open, a pair of disgorging arms extending outwardly in opposed relation from the guiding and supporting element in advanced position adjacent said cutting member for spreading the opened stomach and loosening the contents thereof, abrading and spraying means mounted medially of the ends of said guiding and supporting element for abrading and washing the lining of a stomach, and a hopper underlying the guiding and supporting element for receiving the contents of the stomach and washing water.

3. Apparatus for opening and washing hog stomachs and the like comprising, an elongated guiding and supporting tube having a closed free end extending forwardly of the apparatus for receiving a separated whole hog stomach through the pyloric valve and pocket thereof, said tube being adapted to receive a supply of water under pressure, an advancing member closely overlying the guiding and supporting tube and adapted to engage and pull a stomach in guided relation along the guiding and supporting tube, a cutting member closely underlying the guiding and supporting tube and disposed in opposed relation to said advancing member adjacent the forwardly extending free end of the guiding and supporting tube for slitting said stomach completely open, a plurality of laterally secured pipes connected in fluid communication with the guiding and supporting tube and having upwardly directed orifices for spraying water upwardly against the lining of a stomach, and a pair of sheets, one at each side of the guiding and supporting tube, extending outwardly and downwardly therefrom to support the full width of an opened hog stomach, said sheets providing perforate scraping surfaces for abrading the lining of the stomach in its open condition while simultaneously flushing and washing the same stomach lining.

References Cited in the file of this patent

UNITED STATES PATENTS

| | | |
|---|---|---|
| 550,986 | Lowry | Dec. 10, 1895 |
| 1,479,104 | Lytle | Jan. 1, 1924 |
| 2,701,386 | Strickler | Feb. 8, 1955 |